(12) United States Patent
Guyer et al.

(10) Patent No.: US 11,263,599 B2
(45) Date of Patent: Mar. 1, 2022

(54) PLASTIC WASTE SYSTEM AND METHOD

(71) Applicant: Yankee Scientific, Inc., Medfield, MA (US)

(72) Inventors: Eric C. Guyer, Dover, MA (US); Carl W. Hustad, Tjome (NO); Thomas Mikus, Rockport, MA (US)

(73) Assignee: Yankee Scientific, Inc., Medfield, MA (US)

( * ) Notice: Subject to any disclaimer, the term of this patent is extended or adjusted under 35 U.S.C. 154(b) by 0 days.

(21) Appl. No.: 17/164,746

(22) Filed: Feb. 1, 2021

(65) Prior Publication Data

US 2021/0233040 A1 Jul. 29, 2021

Related U.S. Application Data

(63) Continuation-in-part of application No. 16/748,940, filed on Jan. 22, 2020, now Pat. No. 10,909,547.

(60) Provisional application No. 62/858,869, filed on Jun. 7, 2019.

(51) Int. Cl.
| | |
|---|---|
| *G06Q 10/00* | (2012.01) |
| *C08J 11/04* | (2006.01) |
| *C01B 3/02* | (2006.01) |
| *C04B 18/20* | (2006.01) |
| *C10J 3/72* | (2006.01) |
| *C10G 1/10* | (2006.01) |
| *B09B 3/00* | (2022.01) |
| *G06Q 30/00* | (2012.01) |
| *G06Q 10/08* | (2012.01) |
| *G06Q 20/14* | (2012.01) |

(52) U.S. Cl.
CPC .......... *G06Q 10/30* (2013.01); *B09B 3/0041* (2013.01); *B09B 3/0083* (2013.01); *C01B 3/02* (2013.01); *C04B 18/20* (2013.01); *C08J 11/04* (2013.01); *C10G 1/10* (2013.01); *C10J 3/72* (2013.01); *G06Q 10/087* (2013.01); *G06Q 20/145* (2013.01); *G06Q 30/0185* (2013.01); *C08J 2300/30* (2013.01); *C10G 2300/1003* (2013.01); *C10J 2300/0946* (2013.01)

(58) Field of Classification Search
CPC .... G06Q 10/30; G06Q 10/087; G06Q 20/145; G06Q 30/0185; B09B 3/0041; B09B 3/0083; C04B 18/20; C08J 11/04; C08J 2300/30
USPC .......................................................... 705/28
See application file for complete search history.

(56) References Cited

U.S. PATENT DOCUMENTS

| | | | |
|---|---|---|---|
| 4,426,936 | A | 1/1984 | Kuo |
| 6,029,141 | A | 2/2000 | Bezos |
| 7,959,376 | B1 | 6/2011 | Duesel, Jr. |
| 7,998,714 | B2 | 8/2011 | Gellett |
| 8,252,242 | B2 | 8/2012 | Vandor |
| 8,812,399 | B2 | 8/2014 | Jacobsen |
| 9,834,381 | B2 | 12/2017 | Wang |
| 10,174,943 | B2 | 1/2019 | Boulet |

(Continued)

FOREIGN PATENT DOCUMENTS

JP 2003006385 A 1/2003

*Primary Examiner* — Russell S Glass
(74) *Attorney, Agent, or Firm* — Loginov & Associates, PLLC; William A. Loginov

(57) ABSTRACT

The present application overcomes the disadvantages of the prior art by providing a system for proper life-cycle management of plastic products and the plastic waste that plastic products produce.

10 Claims, 2 Drawing Sheets

(56) References Cited

U.S. PATENT DOCUMENTS

| | | | |
|---|---|---|---|
| 2004/0199401 A1* | 10/2004 | Wagner | G06Q 10/30 |
| | | | 235/385 |
| 2006/0053791 A1 | 3/2006 | Prentice, III | |
| 2011/0000402 A1 | 1/2011 | Grasso, Jr. | |
| 2011/0173139 A1 | 7/2011 | Zauderer | |
| 2012/0150756 A1 | 6/2012 | Belady | |
| 2012/0173395 A1 | 7/2012 | Price | |
| 2012/0185304 A1* | 7/2012 | Belady | G06Q 10/30 |
| | | | 705/14.1 |
| 2013/0025188 A1 | 1/2013 | Cheiky | |
| 2013/0266380 A1 | 10/2013 | Capron | |
| 2013/0297518 A1 | 11/2013 | Nassar | |
| 2013/0339216 A1 | 12/2013 | Lambert | |
| 2016/0194262 A1 | 7/2016 | Ravikumar | |
| 2016/0218593 A1 | 7/2016 | Cheiky | |
| 2017/0011364 A1* | 1/2017 | Whitman | H04L 67/42 |
| 2019/0304236 A1* | 10/2019 | Chan | G07F 7/0609 |
| 2020/0189844 A1* | 6/2020 | Sridhar | H04W 4/80 |
| 2021/0170451 A1* | 6/2021 | Shrout | G06K 9/00664 |
| 2021/0233040 A1 | 7/2021 | Guyer | |

* cited by examiner

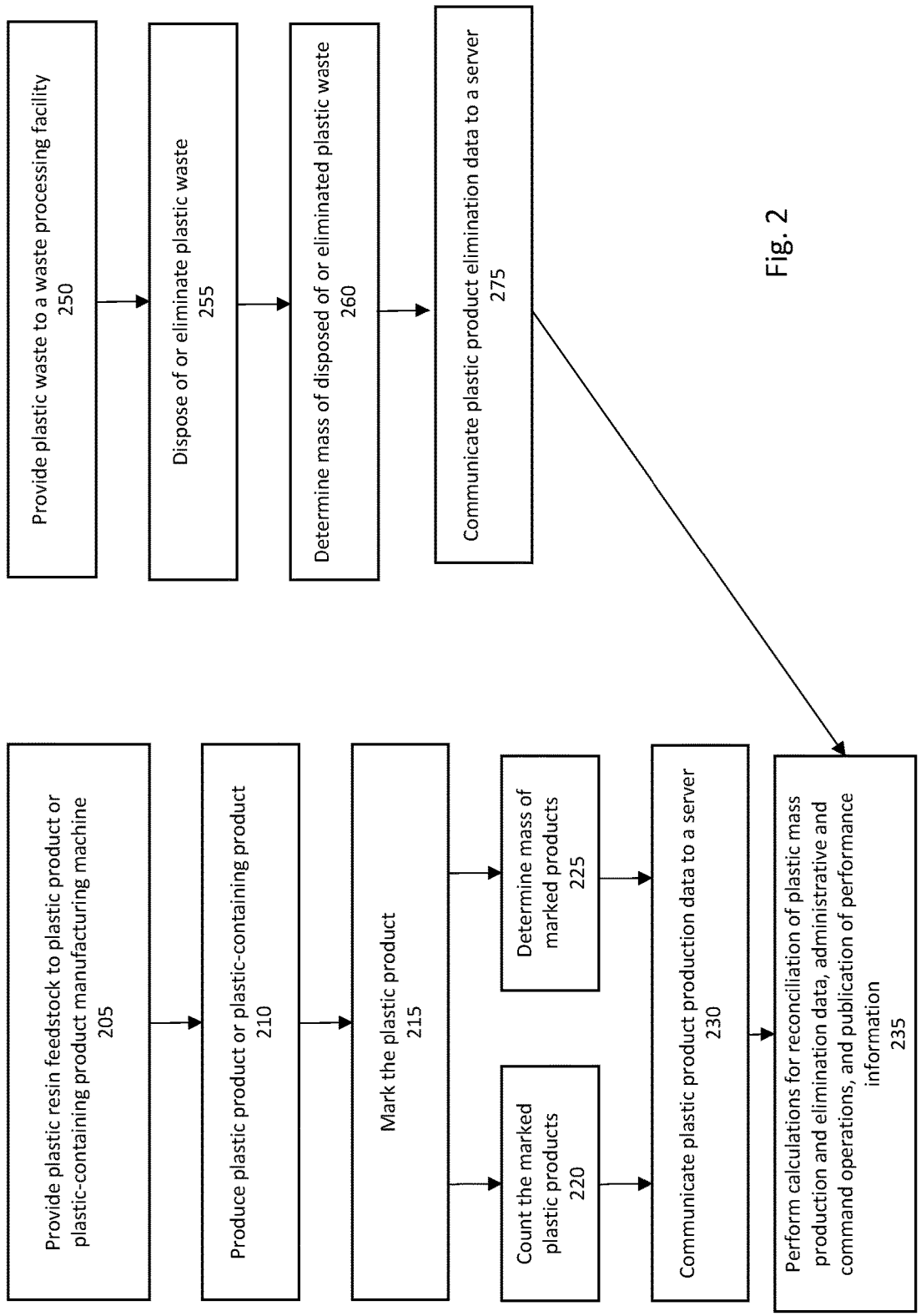

PLASTIC WASTE SYSTEM AND METHOD

RELATED APPLICATIONS

This application is a continuation-in-part of co-pending U.S. patent application Ser. No. 16/748,940, filed Jan. 22, 2020, entitled SYSTEM AND METHOD FOR PLASTIC WASTE DISPOSAL, which claims the benefit of U.S. provisional application Ser. No. 62/858,869, entitled SYSTEM AND METHOD FOR PLASTIC WASTE DISPOSAL, filed Jun. 7, 2019, the teachings of each which applications is incorporated herein by reference.

FIELD OF THE INVENTION

The invention relates to a process and data management system for the environmentally responsible and verifiable management of the life cycle of plastic so as not to contribute to the accumulation of plastic waste in the general environment.

BACKGROUND OF THE INVENTION

Plastic materials, which are produced predominately (over 99%) by the polymerization of fossil hydrocarbons, have become essential to achieving many of mankind's lifestyle and health objectives. Production and use continue to expand. Production of plastics from fossil hydrocarbons has grown worldwide at an astonishing compound annual growth rate of 8.6% since 1950. The U.S. shale gas boom currently fuels a massive buildout of plastics infrastructure in the United States. Nonetheless, there is a growing dark side to this industry. It involves plastic waste.

Plastics environmental sustainability is the most critical issue facing the plastics industry today. The Plastics Industry Association, in a policy statement, has recognized that it is increasingly necessary to incorporate sustainability in their business plans to retain their "social license to operate". Sustainability is the main theme of a recent Global Plastics Summit of the Plastics Industry Association. Dealing with low-grade, post-consumer plastic waste is the biggest sustainability problem faced by the industry.

The primary current method for managing plastic waste involves manufacturers marking their products with the type of contained plastic. From that point on, the manufacturers totally rely on the downstream waste processing industry to separate and process the plastic waste for recycling or reuse. Today, it is widely recognized that this system has failed to keep up with the creation of plastic waste generation and a considerable fraction of this waste now detrimentally enters the environment as hazardous material. This system fails for several reasons including difficulty of separating plastic by type from other waste and the limitations of the ability to recycle plastic on account of its general molecular degradation over time, compared to essential element materials such as iron, copper, and aluminum. Simply marking products for contained type of plastic material for the purposes of indicating potential for recycling alone is not a system that embodies financial responsibility and accountability for the cost of proper disposal to the manufacturer or buyer of plastic products. Also, the practice of marking plastic products as containing "recycle" plastic does not specifically provide the assurance of compulsory and compensatory plastic waste elimination and is limited, as a concept, in its application since many products cannot be manufactured with recycled plastic because of technical reasons.

A better system or method is needed to ensure that manufacturers of plastic products, and their customers, are providing for the environmentally responsible handling of plastic over its life cycle. Essentially, there needs to be a system and method of building in the inevitable costs of proper waste handling into the cost of plastic products and providing for the assurance, to the product manufacturer and user, that the amount of plastic material they use is currently disposed or eliminated from the environment. The purpose of this invention is to provide such a system for proper life-cycle management of plastic products and the plastic waste that plastic products produce.

SUMMARY OF THE INVENTION

The present application overcomes the disadvantages of the prior art by providing a system for proper life-cycle management of plastic products and the plastic waste that plastic products produce.

The present application provides a process and data management system for the environmentally responsible and verifiable management of the life cycle of plastic products. The present application achieves this goal by recording both the production, or use, of plastic products and the disposal or elimination of plastic waste in an environmentally responsible manner, as described below, in an amount equal to, or proportional to, the actual amount of plastic material contained in produced or used plastic products. Production or use of plastic products and materials, by way of this invention, can be reconciled with the actual amount of environmentally responsible plastic waste elimination achieved by a third-party, or their supplier of such services, and provides, a) the basis for which fees that are to be paid by the producer or user of plastic products to the third-party for providing a guarantee of environmentally responsible plastic waste elimination, and b) the basis for fees paid by said third-party to any supplier, to the third-party, of environmentally responsible disposal and elimination of plastic waste. The present application also provides a mechanism so the buyer or users of such plastic products is ensured that their use of these plastic products is consistent with their wish for environmentally responsible use of plastic. In operation, the present application can advantageously resolve the above-described plastic waste problem in a practical and economical manner with systematic accountability.

"Environmentally responsible", as used above and for the purposes of the present application, means the disposal or elimination of plastic waste, in an amount that is equivalent to, or proportional to, the mass of plastic waste contained in such produced plastic products wherein such disposal or elimination method achieves; a) at least a 50% reduction in the direct carbon dioxide emissions that would otherwise occur with conventional incineration of such amounts of plastic waste, b) that achieves at least an 80% reduction of the mass of such amount of plastic waste that would otherwise be deposited in a conventional landfill, and/or c) that provides a permanent, auditable, and certifiable record of the performance of such applied waste disposal and elimination processes in the amounts needed to the producer of such plastic products and other concerned parties.

The present application has applicability to all products composed entirely or partly of plastic material, wherein the term plastic means a solid hydrocarbon polymeric material, such as polyethylene, polypropylene, polystyrene, polyvinyl chloride, and nylon, and that may include any additive or filler material.

One aspect of the disclosure provides a system for achieving environmental responsibility in the production and use of plastic products and materials, comprising: a) at least one instrument for marking plastic, or plastic-containing, materials and products with a detectable and observable imprint, mechanical embossment, label, or other signifying mark or inclusion at a time of production or use; b) a first data recording device configured for continuous and routine recording of a total mass of plastic substance contained in the marked plastic, or plastic-containing, materials and products, the at least one production data recording device being connected to at least one mechanical or electronic sensor configured to count a number of marked plastic or plastic-containing product, and configured for the periodic transmittal, from the at least one production data recording device to a data acquisition and control unit or data server, of the total mass of plastic recorded by the first recording device; c) the data acquisition and control unit or data server that receives the data transmitted from said first data recording device, automatically manages routine billing of fees, to be paid by a producer or user of the marked plastic products or materials to the operator of the data server, in accordance with an agreed upon schedule of fees, for securing a guarantee, from the operator of the data server to said producer or user of plastic materials, of the disposal or elimination from the environment, in an environmentally responsible manner, of an amount of plastic that is an equivalent to, or proportional to, the mass of plastic produced or used and marked by said producer or user of plastic materials, transmits instructions to operators of environmentally responsible plastic waste processing facilities in fulfilment of obligations incurred in the provisions of said guarantee, receives data from plastic waste processing facilities regarding the elimination of plastic waste and provides data for certification to interested parties that such environmentally responsible disposal or elimination of plastic waste has been achieved by recording and reconciling plastic production and plastic waste elimination data; d) a facility for the disposal or elimination, in an environmentally responsible manner, of an amount of plastic waste that is equivalent to, or proportional to, the mass of plastic produced, or used, and marked by said producer or user of plastic materials; and e) a second data recording device located at the site or sites of said environmentally responsible plastic waste processing facility or facilities, that is configured to: receive orders for plastic waste disposal or elimination from said data server, verify that such orders for plastic waste disposal and elimination are fulfilled, and transmit, to the said data server, operating data regarding the performance and accomplishment of the plastic waste processing facility in undertaking the environmentally responsible removal of said equivalent, or proportional amount of mass of plastic from the environment.

In one example, the facility for the disposal or elimination, in an environmentally responsible manner, disposes or eliminates plastic waste by incineration with capture of carbon dioxide for further product application or for permanent sequestration in geologic formations.

In one example, the facility for the disposal or elimination, in an environmentally responsible manner, disposes or eliminates of plastic waste by mechanical reprocessing of the plastic waste into saleable plastic resin for use in the manufacture of products.

In one example, the facility for the disposal or elimination, in an environmentally responsible manner, disposes or eliminates of plastic waste by gasification to synthesis gas or the conversion to liquid hydrocarbon fuel.

In one example, the facility for the disposal or elimination, in an environmentally responsible manner, disposes or eliminates of plastic waste by chemical or biological processing of plastic waste into other useable hydrocarbon substances such as fuel or chemical feedstocks.

In one example, the facility for the disposal or elimination, in an environmentally responsible manner, disposes or eliminates plastic waste by commingling with production of cement or asphalt.

In one example, the facility for the disposal or elimination, in an environmentally responsible manner, disposes or eliminates plastic waste by incineration and the underground carbon mineralization of the produced carbon dioxide into carbonate rock formations.

Another aspect of the disclosure provides a plastic waste system, comprising: a marking instrument configured to mark a plastic or plastic-containing product; a first data recording device comprising one or more sensors and configured to determine plastic production data comprising a number of plastic or plastic-containing products marked by the marking instrument and a mass of plastic or plastic-containing products marked by the marking instrument; a plastic waste disposal or elimination facility configured to dispose of or eliminate a mass of plastic waste; a server configured to receive the plastic production data and the mass of eliminated plastic waste such that the mass of eliminated plastic waste is equivalent to, or proportional to, the mass of marked plastic or plastic-containing product.

In one example, the plastic waste disposal facility disposes of or eliminates the mass of plastic waste by at least one of: incineration with capture of carbon dioxide for further product application or for permanent sequestration in geologic formations, mechanical reprocessing of the plastic waste into saleable plastic resin for use in the manufacture of products, gasification to synthesis gas or the conversion to liquid hydrocarbon fuel, chemical or biologic processing of plastic waste into other useable hydrocarbon substances such as fuel or chemical feedstocks, production of cement or asphalt, or incineration and the underground carbon mineralization of the produced carbon dioxide into carbonate rock formations.

In one example, the system further includes a plastic product or plastic-containing product manufacturing process machine configured to generate the plastic or plastic-containing product from plastic resin feedstock.

In one example, the plastic product or plastic-containing product manufacturing process machine comprises at least one of: a plastic injection molding machine, a plastic extrusion machine, a plastic blow molding machine, or a plastic sheet thermoforming machine.

In one example, the marking instrument marks the plastic or plastic-containing product at least one of: directly on a surface of the plastic or plastic-containing product, or on a portion of the plastic or plastic-containing product made from a non-plastic material.

In one example, the sensors are mechanical sensors or electronic sensors.

In one example, the server receives the plastic production data on a periodic basis from the first data recording device.

In one example, the server receives the mass of eliminated plastic waste on a periodic basis from a second data recording device located at the plastic waste disposal or elimination facility.

In one example, the first data recording device transmits instructions, based upon the plastic production data, to the plastic waste disposal or elimination facility to commence with disposal or elimination of the plastic waste equivalent to, or proportional to, the mass of marked plastic or plastic-containing product.

In one example, the plastic waste disposal or elimination facility generates useful plastic products.

Another aspect of the disclosure provides a method for environmentally responsible production of plastic and elimination of plastic waste, comprising: manufacturing plastic or plastic-containing product from plastic resin feedstock; marking the manufactured plastic or plastic-containing product; determining a number of marked plastic or plastic-containing product and a mass of marked plastic or plastic-containing product; disposing of or eliminating a mass of plastic waste such that the mass of eliminated plastic waste is equivalent to, or proportional to, the mass of marked plastic or plastic-containing product.

BRIEF DESCRIPTION OF THE DRAWINGS

The invention description below refers to the accompanying drawings, of which:

FIG. 2 is a flow chart of material and information flow among the different material and data processing devices according to an exemplary embodiment.

DETAILED DESCRIPTION

Figure 1:
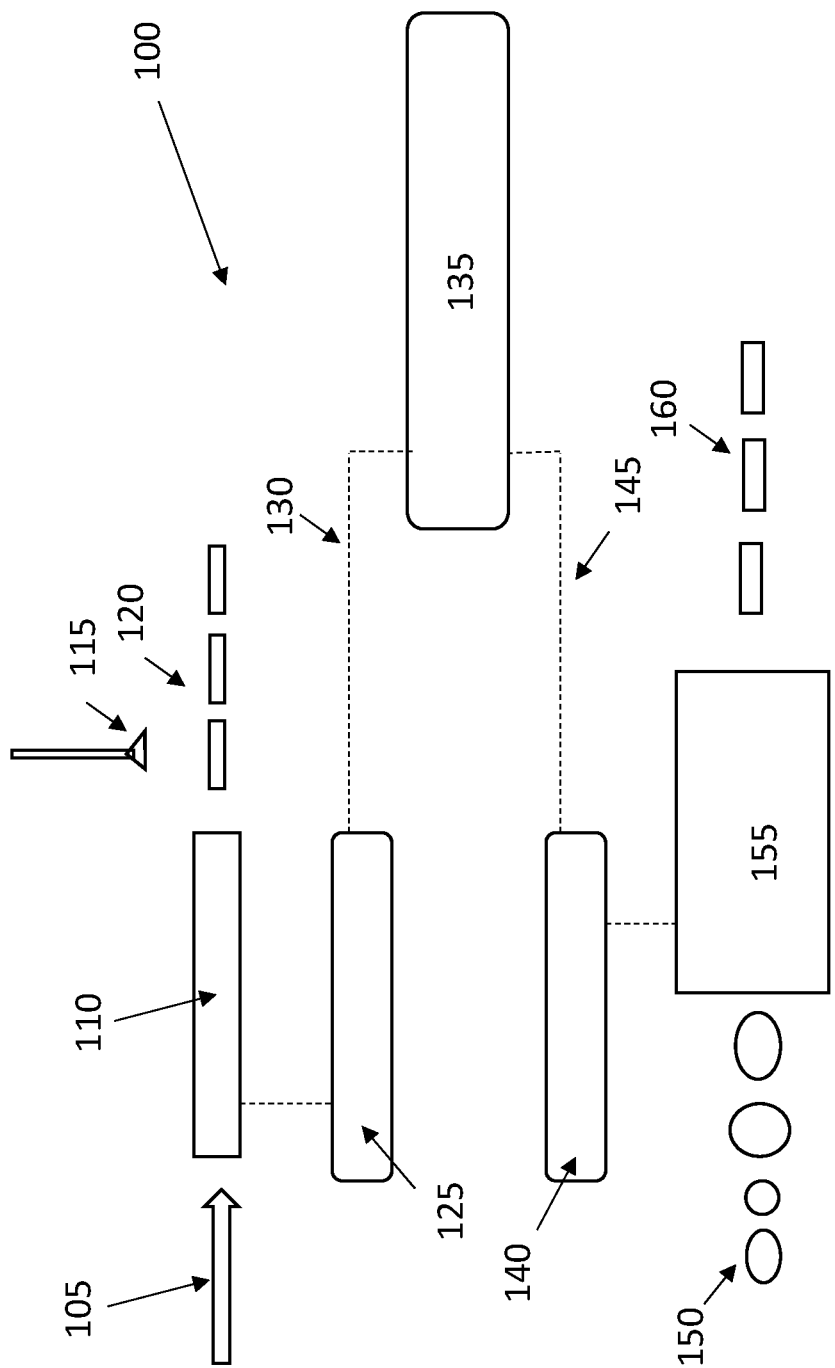
FIG. 1 is a schematic of the process and data management system according to an exemplary embodiment.

FIG. 1 is a schematic of a plastic waste system 100 depicting an overall process and data management according to an exemplary embodiment, and FIG. 2 is a flow chart of information and material flow among the different data processing devices and material processing devices according to an exemplary embodiment.

As shown in FIG. 1 and with reference to block 205 of FIG. 2, plastic resin feedstock 105 can be provided directly or indirectly to a plastic product or plastic-containing product manufacturing machine 110, which is configured to generate plastic product or plastic-containing product from plastic resin feedstock 105. Plastic resin feedstock 105 can be in the form of pellets, which can be used in one or more plastic injection molding processes. In another example, the plastic resin feedstock 105 can be in the form of a sheet, which can be used in plastic thermoforming processes.

The plastic product or plastic-containing product manufacturing process machine 110 can be any type of machine capable of processing plastic, or plastic-containing, product. In one example, the machine 110 can be a plastic injection molding machine or plastic extrusion machine or plastic blow-molding machine, and in another example, machine 110 can be a plastic sheet thermoforming machine. In still another example, machine 110 may comprise one or more machines performing an assembly process or sub-process that combines preformed plastic components with components made from other materials such as metal, wood, or ceramic.

With reference to block 210 of FIG. 2, the plastic or plastic-containing product manufacturing process machine 110 can operate on the plastic resin feedstock 105 to generate one or more plastic or plastic-containing products 120. Products 120 may be of any type of product made, at least whole or in part, from plastic, such as containers, medical items, packaging materials, tools, implements, appliances or appliance parts, toys, and decorative or novelty items as well as plastic rods, sheet, or tubing.

With reference to block 215 of FIG. 2, during production, after production, or both during and after production of the plastic or plastic-containing product 120 by machine 110, each (or at least some part of) product 120 is marked or labeled by action of marking instrument 115 with a symbol that is recognizable to a consumer-buyer of the produced plastic product as a guarantee by a third-party that an equal, or proportional, amount of plastic material contained in the product will be removed from the environment and disposed of, or eliminated, in an environmentally responsible manner with specification of performance as outlined above and that the producer of product 120 has paid or otherwise compensated such third party for this equal, or proportional, plastic waste elimination or disposal in an environmentally responsible manner.

Marking instrument 115 can be any type of device capable of marking or labeling the plastic or plastic-containing product 120, for example with a detectable and observable imprint, mechanical embossment, label, or other signifying mark or inclusion at a time of production or use. For example, marking instrument 115 can be a component of a plastic mold that produces said symbol directly in the surface of plastic contained in the product 120, a device for attaching of a label to the surface of product 120, a stencil or other means of printing ink or paint directly on surface of the product 120, a mechanical stamp for embossing surface of the product 120, a laser for etching the surface of product 120, or a machine for the physical machining of the surface of product 120. Accordingly, marking instrument 115 can mark or label the plastic and plastic containing products with said symbol by any number of techniques that includes adding one or more labels to the product 120, adding an imprint with paint or ink to the product 120, or by embossing a mark directly into the plastic product 120 by action of mechanical and/or thermal deformation of the plastic product surface.

For some (or in some examples all) of the products 120, the marking (e.g., the recognizable symbol) performed by marking instrument 115 may not occur on the actual plastic material, and may be placed on parts of the product that is made from other (e.g., non-plastic) materials such as paper, wood, metal, or ceramic as the intent is to signal to the buyer of the product that the product is made and sold with the guarantee of the offsetting removal of plastic waste from the environment as described above and thus direct marking of the plastic contained in the product is not essential for the operation of this invention.

The plastic waste system 100, with reference to blocks 220 and 225 of FIG. 2, can also include a data recording device 125 (e.g., a first data recording device) configured to record a number of and total mass of plastic contained in products 120 marked by marking instrument 115. While a single device 125 is depicted, a plurality of a network of devices 125 can be implemented to count and/or record the marked plastic product.

The data recording device 125 can be a dedicated digital computer and/or data logging device, and in one example can be a general-purpose computer and may include a processor, a memory, and any other components typically present in general purpose computers. The memory may store information accessible by the processor, such as instructions that may be executed by the processor or data that may be retrieved, manipulated, or stored by the processor. In some examples, the processor and/or memory may respectively comprise one or more processors and/or memories that may or may not be stored in the same physical housing. In one example, the computer may be a server that communicates with one or more client devices, directly or indirectly, via a network.

The recording device 125 can also include one or more on-board sensors for detecting the marked products. Such sensors can include, for example, mechanical and/or electronic sensors capable of identifying and counting a number of products marked by marking instrument 115. In other examples, the one or more sensors may be off-board and may be connecting wired or wirelessly, for example, or the sensors may be onboard and/or integral with the marking device 115 itself. The recording device 125 receives one or more inputs from the sensors and/or may have inputs from multiple marking instruments 115 that are operated with multiple machines 110 in the production of different types of products 120. Such recording may be made using mechanical counters activated by the action of marking instrument 115, and such mechanical counters may have electronic outputs to facilitate data collection of the numbers of products so marked.

Also input into the data recording device 125 is the mass (for example grams, kilograms, or pounds) of plastic material contained in each of the manufactured products 120. This plastic mass data input to the recording device 125 may be manually produced by way of electronic-human interface panel that allows input of the manufactured product plastic mass data by the operator of process or machine 110, or the data recording device 125 may be preprogrammed (e.g., a lookup table) with the plastic mass data of different products 120 produced by process or machine 110, which in such cases utilizes a capability of the machine 110 to input to the data recording device 125 the particular type of product being manufactured.

With reference to block 230, data recording device 125, on a regular periodic basis such as daily, weekly, or monthly, by human command or automatic action, communicates its recorded plastic product 120 production data (e.g., counted plastic products and/or mass) to a secure data system, or data server, 135 via a communication link 130 (e.g., wired or wireless connection). The data server 135 accumulates and records such data, with data server 135 typically remotely located from the location of manufacturing process or machine 110. Typically, the data system, or data server, 135 will be under the control of the third-party that, as described above, provides the guarantee of the environmentally responsible disposal or elimination of plastic waste in return for payments of fees by the owner of process or machine 110 to said third-party. Such data can be transmitted by written or electronic documents on a regular periodic basis such as daily, weekly, monthly, quarterly, or annually.

In response to the data received from recording device 125 and input to data system 135, at block 235, the data server 135 (e.g., server) then performs the calculations and performs subsequent actions necessary for the generation and issuance of electronic signals or printed materials that enable the periodic billing of plastic waste processing fee statements, by the server 135 (e.g., third-party server or third-party operating data system), to the plastic or plastic containing product manufacturer owning or operating process or machine 110. These fees will be calculated by the data server 135 based on, a) the cost rate, per unit mass of plastic product produced by each process or machine 110, for plastic waste disposal or elimination undertaken by, or on behalf of, the third-party as agreed upon between the third-party operator of data server 135 and the product manufacturers owning or operating machine or machines 100, and b) equal to or proportional to the amount of plastic mass contained in the manufactured products 120 since the most recent billing period as reported by recording device, or devices 125.

In this regard, the server 135 may receive the data transmitted from the first data recording device 125, automatically manage routine billing of fees, to be paid by a producer or user of the marked plastic products 120 or materials to the operator of the data server, in accordance with an agreed upon schedule of fees, for securing a guarantee, from the operator of the data server 135 to said producer or user of plastic materials, for the disposal or elimination from the environment, in an environmentally responsible manner, of an amount of plastic waste 150 that is equivalent to, or proportional to, the mass of plastic produced or used and marked by said producer or user of plastic materials, transmits instructions to operators of environmentally responsible plastic waste facilities 155 in fulfilment of obligations incurred in the provisions of said guarantee, receives data from plastic waste elimination facilities 155 regarding the processing of plastic waste 150 and provides data for certification to interested parties that such environmentally responsible disposal or elimination of plastic waste has been achieved by recording and reconciling plastic production and plastic waste elimination data.

After receiving the data from recording device(s) 125, the data server 135 issues the instructions to the waste processing facility 155 to commence with the environmentally responsible disposal or elimination of an equivalent or proportional mass of plastic waste, as reported by recording device(s) 125.

With reference to block 250 of FIG. 2, plastic waste 150 is provided to a waste processing facility 155, which, with reference to block 255 operates to dispose of or eliminate plastic waste 150. Such plastic waste 150 can be gathered from any resource of industrial or municipal waste and trash and may or may not be composed entirely of plastic material. Waste processing facility may be in any location and without proximity to process or machine 110 or server 135.

Data server 135 is connected to data acquisition and collection device or devices 140, (e.g., a second data recording device) typically a digital computer (having a processor and memory) or data logger, located at waste processing facilities 155 that dispose of or eliminate plastic waste 150. While a single device 140 is depicted, a plurality of a network of devices 140 can be implemented.

With reference to block 255 of FIG. 2, facilities 155 operate to dispose of or eliminate plastic waste in an environmentally responsible manner as previously described and may optionally produce useful products 160. In some examples, useful products 160 are not produced. Processing facilities 155 may process solely plastic waste, either a single type of plastic or a mixture of types of plastic, or plastic waste mixed with other waste, or plastic waste used for co-firing with other combustible products (e.g., based on other hydrocarbons or biomass).

With reference to block 260, data collection device or devices 140 located at processing facility 155 determine and record the mass and flow (for example tons/hour or lbs./hour) of plastic contained in the plastic waste 150. The operation of data collection devices 140 may be enabled with any of a number of methods for measuring the flow of plastic mass into the waste processing facility such as optical scanning or by routine sampling of the total waste flow and mechanically separating and weighting the plastic constituents.

In this regard, the data collection device 140 receive orders for plastic waste disposal or elimination from the data server 135, verify that such orders for plastic waste disposal and elimination are fulfilled, and transmit, to the data server 135, operating data regarding the performance and accomplishment of the plastic waste processing facility in undertaking the environmentally responsible removal of said equivalent, or proportional amount of mass of plastic from the environment.

With reference to block 275, the data collection devices 140 report periodically, such as daily, weekly, or monthly, by written or electronic documents to the data server 135, the mass of plastic material processed for environmentally responsible disposal or elimination at the processing facility 155.

With reference again to block 235, data server 135 keeps an accounting of both the data received from recording devices 125 and data acquisition devices 140 to ensure that the objective of eliminating, by an environmentally responsible process 155, of an amount of plastic waste that is equivalent or proportional to amount of plastic that has been produced by each of the processes or machines 110 monitored by data devices 125, is achieved. Any discrepancies, meaning any positive difference in between the plastic produced in products by machines 110, individually and in total, and the amount of plastic waste processed for elimination by facilities 155, individually and in total, are reconciled by data server 135 by transmission of additional instructions for plastic waste elimination processing at processing facility, or facilities 155.

Data system or data server 135, with input from data devices 125 and 140, thus operates, in an auditable fashion, to record the performance and throughput of the processing facility 155 to ensure and verify that an equivalent or proportional amount of plastic material produced by the product manufacturer, by process or machine 110, is eliminated from the environment in an environmentally responsible manner by processing facilities 155 as defined above. The data server 135 operates in an auditable fashion such that any authorized party, charged or authorized to verify the integrity of the inputs and outputs and calculations performed by the data system or data server 135, can confirm the validity and accuracy of all such inputs and outputs, and calculations by that device in the manners customary to financial auditors.

The plastic waste processing data provided by the data recording devices 140 to data server 135 may also be for the basis of billing for operational costs of the plastic waste processing at processing facilities 155 by the operator of such facilities to said third-party operator of data server 135. The data server 135 may automatically generate reports to both the plastic product manufacture, the owner of machine 110, and the processing facilities 155. Such reports can provide the basis for operators of these processes and facilities to facilitate adjustment of product production by process or machine 110 or adjustment of operation of the plastic waste processing undertaken at processing facility 155, or group of facilities 155, to be consistent with the disposal or elimination guarantee provided by the third-party to the plastic product producer or user.

Advantageously, the plastic waste system 100 comprising the data server 135 and the data devices 125 and 140, along with sensors connected to data devices 125 and 140 provides the third-party operator of data server 135 an ability to provide a guarantee, to the product manufacturer, product buyer, and product user of such products marked by instrument 115, that there is no net and general accumulation of plastic waste in the environment on account of the manufacture or use of plastic products produced by machine, or machines, 110. This guarantee is a product feature that may be commercially valuable to the product manufacturer, product buyer, and product user.

The secure communication links, 130 and 145, among these data devices 125, 135, and 140 may be any of several available mechanical, electronic, optical or a combination of these.

Data server 135 of the present application may also have the feature, for example, of providing a publicly accessible website that lists the plastic and plastic products that are being tracked for production and the associated plastic waste disposal and elimination and provide real-time updates on the performance of the plastic waste system invention, such as with respect to accumulated environmental benefits, such as carbon dioxide emissions avoidance and mass of plastic waste elimination. Data server 135 also has the capability to provide the results of this reconciliation of plastic waste elimination with plastic product production to authorized parties that may wish to observe or audit the operation of the invention. For example, server 135 may maintain a web page that lists, on a continuing basis, the amounts of plastic product produced by different machines and processes 110 and the associated equivalent or proportional amounts of plastic waste that have been eliminated by the plastic waste elimination process 155. In providing this information, data server 135 meets the objective for the deployment of the present application which is to allow the manufacturer of plastic or plastic-containing products to claim, by way of marking products, as previously described and by other communication methods and announcements, that they are meeting their goals in the environmentally responsible management of the life cycle of plastic in a verifiable and certifiable manner and are not adding to the net amount of plastic remaining or accumulating in the environment.

It is a characteristic of the present application that, as a result of its operation, it applies the principle of environmental "offset" which is a well-established means of achieving environmental benefit. An environmental offset is generally understood to be a deliberate action taken by a party for purposes of balancing or negating the impact on the environment of actions taken by that party that cannot otherwise be avoided and, for example, is commonly used in the management of the emissions of carbon dioxide, and other greenhouse gases or harmful pollutant gases.

There are several processes for the environmentally responsible elimination of plastic waste, as described above, which can be deployed within the scope of the present plastic waste system, and for which data collection device or devices 140 can connect. Generally, applicable processes have a net result of having a lower emission of carbon dioxide gas into the atmosphere than simple incineration and have lower requirements for the landfilling of waste material in an environmentally responsible manner as described above. Among these include; a) incineration with gas and solid waste emissions controls, including the capture and sequestration or productive use of the carbon dioxide produced by the incineration process, b) the mechanical processing of plastic waste for reuse, c) the chemical processing of plastic waste into its basic molecular components for reconstitution into saleable plastic resins for manufacture of new products, and d) the chemical and/or biological processing of plastic waste into other useable hydrocarbon substances such as fuel or chemical feedstocks, or gasification into synthesis gas or liquid fuels, and e) the addition of waste plastic to the feedstocks that are used to produce asphalt or cement in manner that limits the release of carbon dioxide gas into the atmosphere.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes several separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for achieving environmental responsibility in the production and use of plastic products and materials, comprising:
   a) at least one instrument for marking plastic, or plastic-containing, materials and products with a detectable and observable imprint, mechanical embossment, label, or other signifying mark or inclusion at a time of production or use;
   b) a first data recording device configured for continuous and routine recording of a total mass of plastic substance contained in the marked plastic, or plastic-containing, materials and products, the first data recording device being connected to at least one mechanical or electronic sensor configured to count a number of marked plastic or plastic-containing product, and configured for the periodic transmittal, from the first data recording device to a data acquisition and control unit or data server, of the total mass of plastic recorded by the first data recording device;
   c) the data acquisition and control unit or data server that receives the data transmitted from said first data recording device, for the disposal or elimination from the environment, in an environmentally responsible manner, of an amount of plastic that is an equivalent to, or proportional to, the mass of plastic produced or used and marked by said producer or user of plastic materials;
   d) a facility for the disposal or elimination, in an environmentally responsible manner, of an amount of plastic waste that is equivalent to, or proportional to, the mass of plastic produced, or used, and marked by said producer or user of plastic materials; and
   e) a second data recording device located at the site or sites of said environmentally responsible plastic waste processing facility or facilities that is configured to: receive orders for plastic waste disposal or elimination from said data server and verify that such orders for plastic waste disposal and elimination are fulfilled.

2. The system of claim 1 wherein the facility for the disposal or elimination, in an environmentally responsible manner, disposes or eliminates plastic waste by incineration with capture of carbon dioxide for further product application or for permanent sequestration in geologic formations.

3. The system of claim 1 wherein the facility for the disposal or elimination, in an environmentally responsible manner, disposes or eliminates of plastic waste by mechanical reprocessing of the plastic waste into saleable plastic resin for use in the manufacture of products.

4. The system of claim 1 wherein the facility for the disposal or elimination, in an environmentally responsible manner, disposes or eliminates of plastic waste by gasification to synthesis gas or the conversion to liquid hydrocarbon fuel.

5. The system of claim 1 wherein the facility for the disposal or elimination, in an environmentally responsible manner, disposes or eliminates of plastic waste by chemical or biological processing of plastic waste into other useable hydrocarbon substances such as fuel or chemical feedstocks.

6. The system of claim 1 wherein the facility for the disposal or elimination, in an environmentally responsible manner, disposes or eliminates plastic waste by commingling with production of cement or asphalt.

7. The system of claim 1 wherein the facility for the disposal or elimination, in an environmentally responsible manner, disposes or eliminates plastic waste by incineration and the underground carbon mineralization of the produced carbon dioxide into carbonate rock formations.

8. The system of claim 1, wherein the data acquisition and control unit or data receiver automatically manages routine billing of fees, to be paid by a producer or user of the marked plastic products or materials to the operator of the data server, in accordance with an agreed upon schedule of fees, for securing a guarantee, from the operator of the data server to said producer or user of plastic materials, of the disposal or elimination from the environment, in an environmentally responsible manner, of the amount of plastic.

9. The system of claim 1, wherein the data acquisition and control unit or data receiver transmits instructions to operators of environmentally responsible plastic waste processing facilities in fulfilment of obligations incurred in the provisions of said guarantee, receives data from plastic waste processing facilities regarding the elimination of plastic waste and provides data for certification to interested parties that such environmentally responsible disposal or elimination of plastic waste has been achieved by recording and reconciling plastic production and plastic waste elimination data.

10. The system of claim 1, wherein the second data recording device is configured to transmit, to the said data server, operating data regarding the performance and accomplishment of the plastic waste processing facility in undertaking the environmentally responsible removal of said equivalent, or proportional amount of mass of plastic from the environment.

\* \* \* \* \*